Oct. 26, 1926.
W. C. WALKER
SNAP FASTENER
Filed June 5, 1924
1,604,429
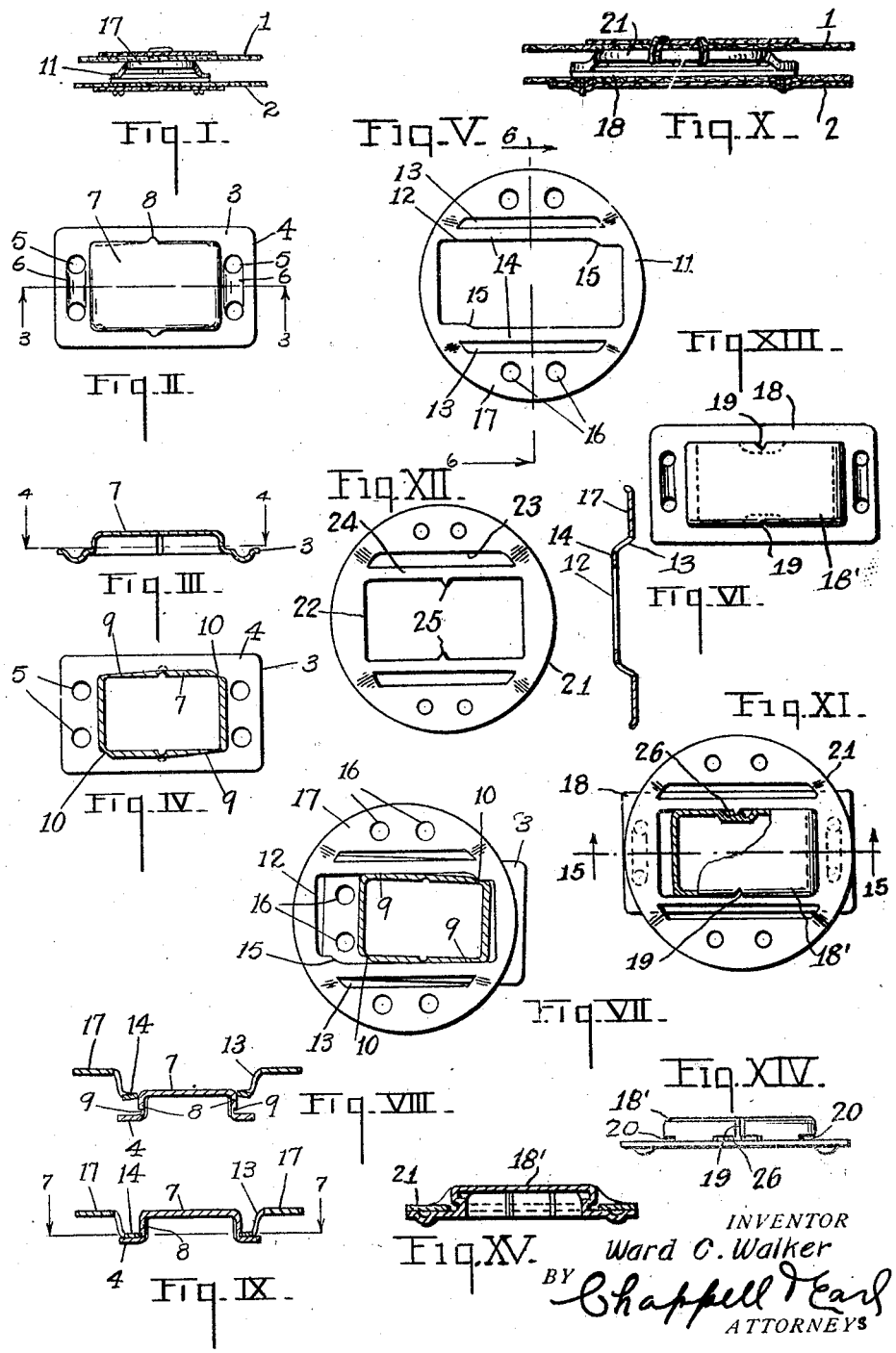
INVENTOR
Ward C. Walker
BY Chappell & Earl
ATTORNEYS Patented Oct. 26, 1926.

1,604,429

UNITED STATES PATENT OFFICE.

WARD C. WALKER, OF BATTLE CREEK, MICHIGAN.

SNAP FASTENER.

Application filed June 5, 1924. Serial No. 718,052.

This invention relates to improvements in snap fasteners.

The main objects of this invention are:

First, provide an improved fastener which is easily engaged and disengaged and at the same time when engaged is very secure.

Second, to provide an improved fastener which is very economical in its parts.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is an edge view of my improved fastener with the parts in engagement, the portions of a garment being illustrated in connection therewith to show the manner of attaching to a garment.

Fig. II is a plan view of the male fastener member.

Fig. III is a vertical section through the male fastener member on a line corresponding to line 3—3 of Fig. II.

Fig. IV is a horizontal section on a line corresponding to line 4—4 of Fig. III.

Fig. V is a plan view of the female fastener member.

Fig. VI is a section on a line corresponding to line 6—6 of Fig. V.

Fig. VII is a sectional view of the members in engagement on a line corresponding to line 7—7 of Fig. IX.

Fig. VIII is a vertical section showing one of the steps in engaging and disengaging the parts.

Fig. IX is a transverse section with the fastener members in engagement.

Fig. X is an edge view corresponding to that of Fig. I, showing a slightly modified form or embodiment of my invention.

Fig. XI is a plan view of a modified form with the members in engagement, the stud member being partially sectioned and partially broken away.

Fig. XII is a plan view of a modified form of the female fastener member.

Fig. XIII is a plan view of a modified form of the male fastener member.

Fig. XIV is a side view of the male fastener member of Fig. XIII.

Fig. XV is a longitudinal section of the members in partially engaged position on a line corresponding to line 15—15 of Fig. XI.

In the drawing similar reference characters refer to similar parts throughout the several views, and the sectional views are taken looking in the direction of the little arrows at the ends of the section lines.

Referring to the drawings, 1 and 2 represent portions of a garment to which I have shown the fastener members connected in Figs. I and X.

My improved fastener comprises a male member 3 having a plate-like base 4 with holes 5 therein for attaching. The base is preferably conformed into a groove 6 between these holes. The male fastener member has an elongated rectangular stud 7 with opposed vertical rib-like lugs 8 on the sides thereof. Grooves 9 extend from these lugs to diagonally opposite corners of the stud. The stud is also provided with undercut recesses 10 on the other diagonally opposite corners.

The female fastener member 11 has an elongated opening 12 therein adapted to receive the stud and slots 13 parallel with the sides of the opening 12 providing spring stud engaging members 14.

At diagonally opposite corners of the opening 12 are cam projections 15. The fastener member 11 is provided with holes 16 adapted to receive the attaching threads, this portion 17 in which the holes are formed being preferably struck up, as shown in the drawings.

With the parts thus formed, the female fastener member is slipped over the stud and the members are moved laterally relative to each other which brings one of the cam lugs 15 into engagement with one of the recesses and imparts a tilting or twisting movement to the members, swinging the edges of the female member into the grooves 9. Thus engaged, it is quite impossible to disengage the parts until they are again moved laterally relative to each other, bringing the edges of the stud engaging members out of the grooves, and the parts may be quite easily disengaged. The pull upon the members, such as ordinarily occurs in use, tends to engage them securely and hold them in engagement. The lugs 8 are disposed so as to engage the spring members 14 centrally when the female fastener member is slipped upon the stud, thereby facilitating the springing of the parts 14 thereof and these also serve to retain the fastener members in engagement until they have been moved laterally imparting the twisting movement as described, and thereby engaging the female fastener member with the undercuts of the stud.

In the modification shown in Figs. X to XV inclusive, the male fastener member 18 has a stud 18' with vertical grooves 19 on the sides thereof and undercut grooves 20 at the ends. The female fastener member 21 has an opening 22 adapted to receive the studs with the slots 23 corresponding to the slots 13, forming stud engaging members 24. These stud engaging members have lugs 25 adapted to enter the grooves 19. When the fastener members are moved longitudinally these lugs 25 enter the undercut recesses 26 and the end edges of the stud opening engage in the grooves 20, thereby securely retaining the parts in engagement.

I have illustrated two forms or embodiments of my invention which I regard as highly practical. I have not attempted to illustrate or describe other forms or embodiments of my improvements as I believe the disclosure made will enable those skilled in the art to embody or adapt my improvements as may be desired.

Having thus described my invention, what I claim as new and desire to secure by Letters Patent, is:

1. In a garment fastener, the combination of a male fastener member provided with a rectangular elongated stud having opposed lugs on the sides thereof and longitudinal grooves extending from said lugs to diagonally opposed corners of the stud, a female fastener member having an elongated stud opening with diagonally opposed cam projections at the ends thereof and slots disposed in parallel relation to the sides of said opening providing spring stud engaging members, said side lugs facilitating the springing of the spring members into engagement with the stud, said stud opening being of such length as to permit relative lateral movement of the fastener members when in engagement whereby one of said cam projections may be engaged with the stud and the stud engaging members engaged with said grooves.

2. In a garment fastener, the combination of a male fastener member provided with a rectangular elongated stud having opposed lugs on the sides thereof and longitudinal grooves extending from said lugs to diagonally opposed corners of the stud, a female fastener member having an elongated stud opening with diagonally opposed cam projections at the ends thereof, said stud opening being of such length as to permit relative lateral movement of the fastener members when in engagement whereby one of said cam projections may be engaged with the stud and the edges of the stud opening engaged with said grooves, said lugs on the sides of said stud facilitating the engagement of the female fastener member therewith.

3. In a garment fastener, the combination of a male fastener member provided with an elongated stud having opposed lugs on the sides thereof and horizontal grooves extending oppositely from said lugs and diagonally opposite undercut recesses, and a female fastener member having an elongated stud opening and cam projections adapted to co-act with said recesses, said stud opening being of such length as to permit relative sliding movement of the fastener members when in engagement whereby one of said cam projections may be engaged with one of the said recesses and the edges of the stud opening engaged with said grooves, said lugs on the sides of said stud facilitating the engagement of the female fastener member therewith.

4. In a garment fastener, the combination of a male fastener member provided with an elongated stud having horizontal grooves at the base thereof, and a female fastener member having an elongated stud opening with cam projections at the ends of said opening and slots disposed in parallel relation to the sides of said opening providing spring stud engaging members, said stud opening being of such length as to permit relative sliding movement of the fastener members when in engagement whereby one of said cam projections is brought into engagement with said stud and the stud engaging members are swung into said grooves.

5. In a garment fastener, the combination of a male fastener member provided with an elongated stud having diagonally opposed horizontal grooves at the base thereof, and a female fastener member having an elongated stud opening with cam projections at the ends of said opening, said stud opening being of such length as to permit relative sliding movement of the fastener members when in engagement whereby one of said cam projections is brought into engagement with said stud and the edges of the said stud opening are swung into said grooves.

6. In a garment fastener, the combination of a male fastener member provided with an elongated stud having diagonally opposed grooves at the base thereof, and a female fastener member having an elongated stud opening of such length as to permit relative lateral sliding movement of the fastener members when in engagement, said female fastener member having diagonally opposed lugs adapted to be brought into engagement with said stud by such a sliding movement and whereby relative twisting movement is imparted to said members to engage the female member with the grooves of said stud.

7. In a garment fastener, the combination of a male fastener member provided with an elongated stud having diagonally disposed horizontal grooves at the base thereof, and a female fastener member having an elongated stud opening with spring stud engaging members at the sides thereof and diagonally disposed cam projections at the ends of the stud opening, the stud opening being of such length as to permit sliding movement of the fastener members when in engagement so that one of the cam projections may be brought into engagement with the stud thereby imparting a relative twisting movement to the members to engage the edges of the female member with the grooves.

8. In a garment fastener, the combination of a male fastener member provided with an elongated stud, a female fastener member having an elongated stud opening of such length as to permit relative longitudinal sliding movement of the fastener members when in engagement, said male fastener member being provided with a groove at the base thereof with which the female member is engaged by a relative horizontal twisting movement of the members, one of the members having a cam projection engaging the other upon such sliding movement and imparting such relative twisting movement to the members to engage said female member in said groove.

In witness whereof I have hereunto set my hand.

WARD C. WALKER.